United States Patent [19]

Oldfield et al.

[11] Patent Number: 5,600,816
[45] Date of Patent: Feb. 4, 1997

[54] SYSTEM AND METHOD FOR MANAGING DATA IN A CACHE SYSTEM FOR A DISK ARRAY

[75] Inventors: Clive S. Oldfield, Southampton; Nicholas Shaylor, Salisbury, both of England

[73] Assignee: International Business Machines Corporation, Armonk, N.Y.

[21] Appl. No.: 171,935

[22] Filed: Dec. 21, 1993

[30] Foreign Application Priority Data

Dec. 22, 1992 [GB] United Kingdom .................. 9226725

[51] Int. Cl.$^6$ .................................................. G06F 12/08
[52] U.S. Cl. ........................ 395/440; 395/441; 395/463
[58] Field of Search .................................. 395/400, 425, 395/440, 441, 463, 444, 445, 250, 872

[56] References Cited

U.S. PATENT DOCUMENTS

| | | | |
|---|---|---|---|
| 4,636,946 | 1/1987 | Hartung et al. | 395/440 |
| 4,920,478 | 4/1990 | Furuya et al. | 395/440 |
| 5,210,866 | 5/1993 | Milligan et al. | 395/575 |
| 5,257,352 | 10/1993 | Yamamoto et al. | 395/441 |
| 5,307,473 | 4/1994 | Tsuboi et al. | 395/425 |
| 5,315,602 | 5/1994 | Noya et al. | 371/40.4 |
| 5,325,509 | 6/1994 | Lautzenheiser | 395/440 |
| 5,341,381 | 8/1994 | Fuller | 371/10.1 |
| 5,408,644 | 4/1995 | Schneider et al. | 395/575 |
| 5,418,921 | 5/1995 | Cortney et al. | 395/440 |

FOREIGN PATENT DOCUMENTS

| | | | |
|---|---|---|---|
| 0462917A2 | 12/1991 | European Pat. Off. | G06F 11/10 |
| 0493984A2 | 7/1992 | European Pat. Off. | G06F 11/10 |

OTHER PUBLICATIONS

A Case for Redundant Arrays of Inexpensive Disks (RAID), David A. Patterson, Garth Gibson, and Randy H. Katz, 1988, pp. 109-116.

*Primary Examiner*—Eddie P. Chan
*Assistant Examiner*—Hiep T. Nguyen
*Attorney, Agent, or Firm*—Esther E. Klein

[57] ABSTRACT

A cache system is described which is adapted for staging data between host memory and a disk array comprising a plurality of disk storage devices plus associated controller unit, data being storable across the disks of the array in the form of strides, each stride comprising a multi-sector 'stripe' of data on each of two or more devices of the array and an associated multi-sector parity block on a further array device. The cache system includes means for linking the data and associated parity making up a stride within the cache as a cache data unit which is manipulated in the cache as a single entity. References from the host to data held within the cache causes the referenced cache unit to move to the head of a list of cache units. Using such a cache system, when a cache unit at the bottom of the list is committed to disk, there is an increased likelihood that most or all the data making up a stride will be in the cache and therefore the number of redundant accesses to the disk needed to generate parity data will be reduced or eliminated.

10 Claims, 3 Drawing Sheets

SYSTEM AND METHOD FOR MANAGING DATA IN A CACHE SYSTEM FOR A DISK ARRAY

FIELD OF THE INVENTION

This invention relates to a cache system for use with disk arrays comprising a number of data storage disk devices and more particularly to a cache system operable to reduce the numbers of redundant accesses to the disks of such arrays.

BACKGROUND OF THE INVENTION

In recent years, there has been a growth in interest in disk arrays. Disk arrays consist of a number of disk drives connected to a host system via one or more controller elements which control the transfer of data between the host and disk drives. A disk array is designed to provide high capacity data storage, high reliability and high data transfer rates to and from the using system.

A number of different array architectures have been proposed. A paper entitled 'A Case for Redundant Arrays of Inexpensive disks (RAID)' (ACM SIGMOD conference proceedings, Chicago, IL., Jun. 1–3, 1988, pp.109–116) details five levels of array (RAIDS 1 to 5) which provide different levels of data management. Each of the RAID levels permits users to increase their data storage capacity by linking together a number of inexpensive disk drives. The RAID system provides protection against loss of data through the failure of a drive by either storing two copies of the data on two drives (RAID 1) or by splitting the original data into a number of subsections and striping the data across two or more drives of the array. The parity data for the striped data is calculated and stored in a dedicated parity drive (RAID-4). In the event that one of the data holding drives fails, it is possible using the parity data and the remaining data of the stripe to reconstruct the data on the failed drive (RAIDs 2 to 5). The architecture of RAIDs 2 to 5 thus allows an increase in data throughput, assuming that these data transfers are allowed a degree of concurrency. This speed-up depends upon the degree of concurrency, the overheads of partitioning the original data transfer into many, shorter, sub-transfers, and the parameter selection regarding the relationship between average transfer length and size of sub-transfer. Further details of the RAID 4 and RAID 5 configurations may be found in the above referenced conference proceedings.

The provision of parity/checksum in a Redundant Array of Inexpensive Disks (RAID-5) system confronts the system architect with many problems. These include error-recovery, data-loss protection, system performance, and implementation complexities. One penalty of employing a RAID system is the potential problem of reduced reliability. The reliability of a RAID system reduces as the number of devices increases, since any single device failure results in a complete array failure. To avoid this unacceptable degradation in system reliability, a method of providing data recovery in the event of a (single) device failure occurring has proven to be necessary. This is achieved by introducing 'redundancy' into the array, in that a 'second' copy of the data is stored as a parity or checksum on a device separate to the associated data devices (e.g. in the RAID 4 configuration). Thus the data is never stored in a single location, since the generation of the parity allows subsequent recovery of lost data resulting from a (single) device failure.

During normal Read operations, there is no performance impact encountered by supporting parity generation. However, during Write operations, the generation of parity becomes a concern. This is due to the fact that any alteration to a data area must have an associated update of the parity data relevant for that data area. Furthermore, the likelihood of system failure between writing the new data and writing the new parity must be minimised, or else data recovery would be impossible. This last requirement is conventionally met by generating and storing the parity on the device in conjunction with the Host storing the data on the device, as and when the data becomes available.

This method poses potentially large overheads, since the parity device is associated with a number of data devices. This poses no superfluous overheads provided all devices associated with a particular parity device are written to concurrently, the resulting parity being a composite of all data devices. This will generally not be the case, since relatively short accesses will not incur access to all devices. In this case, parity generation involves retrieving either the existing data from the unaddressed devices, or reading the existing parity for that data group together with the data prior to writing the new data.

In certain situations, the overhead of parity update due to short transfer lengths becomes unacceptable. This is also the case with longer transfers that are split into sequences of shorter transfers (the Host Filing System may do this).

SUMMARY OF THE INVENTION

The present invention seeks to overcome the drawbacks associated with the prior art and accordingly provides a cache system including a cache memory for staging data transferred between a host system and a disk array, the disk array comprising a plurality of disk storage devices in which data is stored in strides, each stride comprising a multi-sector unit of data on each of two or more devices of the array and an associated multi-sector parity block on a further array device; the cache system including means for linking the data and associated parity making up a stride within the cache as a cache data unit which is manipulated in the cache as a single entity.

Host accesses are directed to a cache memory which contains both the data and the associated parity. In the present invention, the cache is organised not as units based on the size of the smallest data transfer, but on a parity block and its associated data blocks. As an example, a cache unit may be three 4K byte-blocks and the single, 4 Kb parity block.

In a preferred cache system, a cache unit which includes data addressed by the host is moved to the head of a Most Recently Used (MRU) list of cache units. Host write data is then stored in this cache unit, possibly alongside data stored from previous accesses. As further cache units are addressed, a particular 'untouched' unit will be pushed further down the cache list. Using a cache in this manner has the advantage that if the nature of accesses to data within the cache is not entirely random, but contains a degree of sequential accesses (not necessarily directly related to time), and the size of cache is sufficiently large, the likelihood of cache units residing toward the 'unused' end of the cache list containing a full set of valid data will be high. If all the data in a cache unit is present, this allows a subsequent committing of the cached data to the disk array (since cache size is finite) along with the parity that can be generated with no further data accesses. The redundant accesses needed to generate the parity in an uncached architecture are thus eliminated. In the event that not all the data of a cache unit is present in the cache, then it will be necessary to access some data on disk in order to generate the updated parity data. However, the number of the redundant accesses required will be greatly reduced with a consequent improvement in system performance.

The size of cache which is necessary to reduce or eliminate the redundant accesses will be dependent on the nature of the data accesses requested by the host. If the data requests are largely sequential in nature then the amount of cache memory required to eliminate, or substantially eliminate the redundant accesses to the disk devices will be smaller than if the requests are largely random in nature.

In adopting a cache system, it is important to ensure that the data is not allowed to reside in unprotected memory. A preferred cache system employs a dual, non-volatile implementation of cache memory which provides the necessary reliability. In the event of power or hardware-failure, the data is preserved until the system is functioning again. In the event of a (single) device failure, the reconstruction of the lost data is similar to that employed by the conventional approach to parity generation.

BRIEF DESCRIPTION OF THE DRAWINGS

A preferred embodiment of the invention will now be described, by way of example only, with reference to the accompanying drawings in which.

DETAILED DESCRIPTION OF THE INVENTION

In the following, the cache system is implemented in software running on the host processor.

Figure 1:
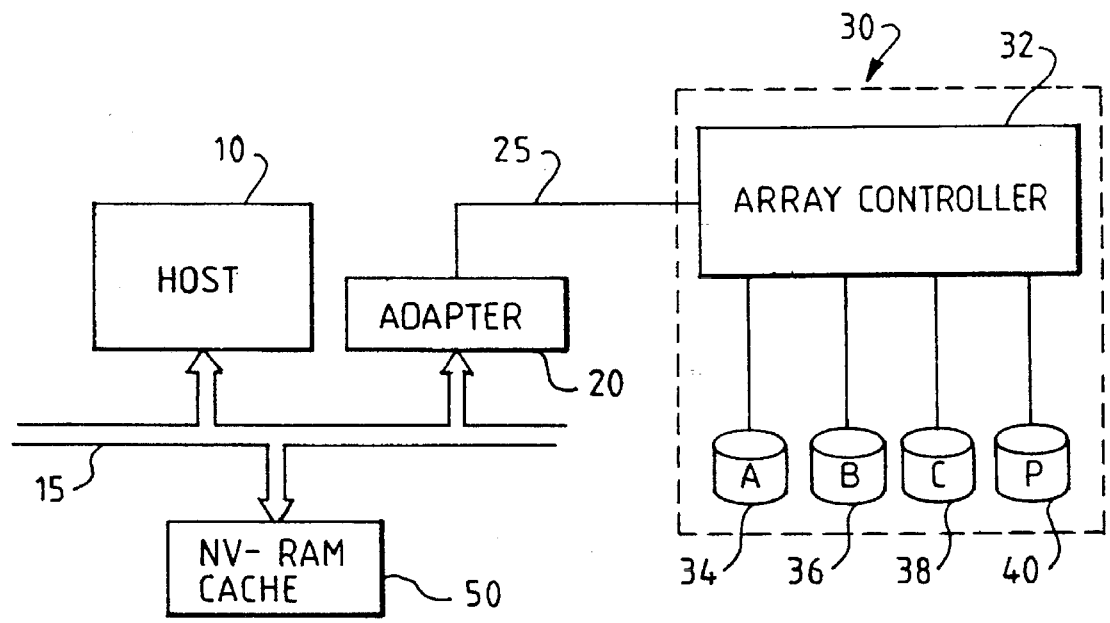
FIG. 1 shows a data storage hierarchy in which a host system is connected via a cache and host adapter to a disk array.

FIG. 1 shows a data processing system comprising a host system 10 connected via a host bus 15 to an array adapter 20. The adapter is connected in turn via a communication link 25 to a disk array 30 taking the form of an array controller 32 attached to four disk data storage devices 34, 36, 38, 40. Also attached to the host bus is a non-volatile cache memory 50 which is used to stage data being transferred between host memory and the disk storage devices of the disk array.

Figure 2:
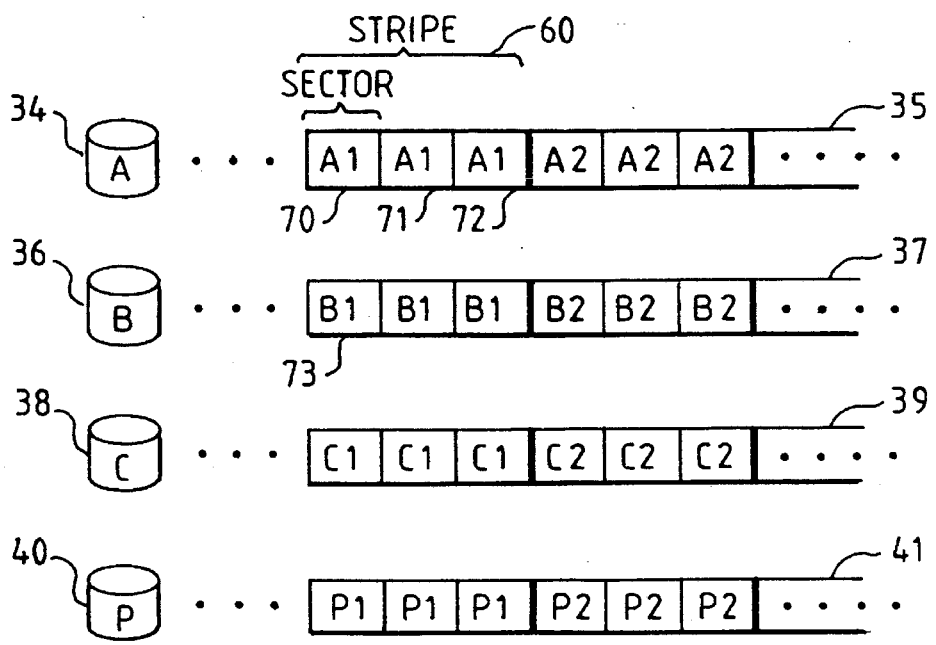
FIG. 2 shows in schematic form the arrangement of a stride of data on the tracks of the data storage devices making up the disk array of FIG. 1.

FIG. 2 shows the manner in which data is stored on the disk storage devices of the array used in conjunction with the cache system of the present invention. In FIG. 2, two strides of data are shown stored across data storage tracks 35, 37, 39, 41 in each of the devices 34, 36, 38 and 40. Each device contains a subunit of the stride known as a stripe 60 which in FIG. 2 is three sectors (3×512 bytes) in length. The first stride of data comprises the three A1 sectors on disk A plus the three B1 sectors on disk B plus the three C1 sectors on disk C and the associated parity data, P1, on the parity disk. Similarly, the second stride of data comprises three A2, three B2, three C2 and three P2 sectors. As described above, in prior art disk array systems, a request from the host to write new sectors 70, 71, 72 and 73 to the array will involve reading from the disks the rest of the data in the stride, the calculation of new parity data and the writing of the new sectors 70, 71, 72 and 73 plus new parity to the array.

Figure 3:
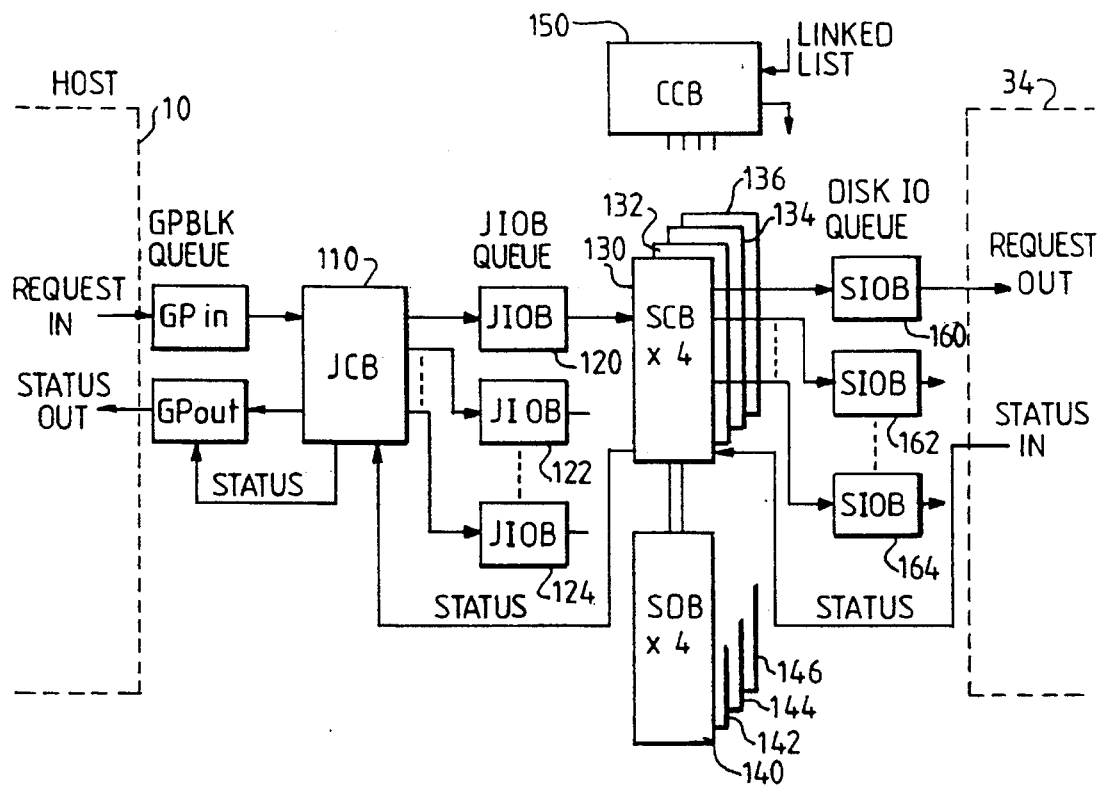
FIG. 3 shows in block diagrammatical form the data request mechanism including the association of control blocks defined by the cache system according to the present invention.
Figure 4:
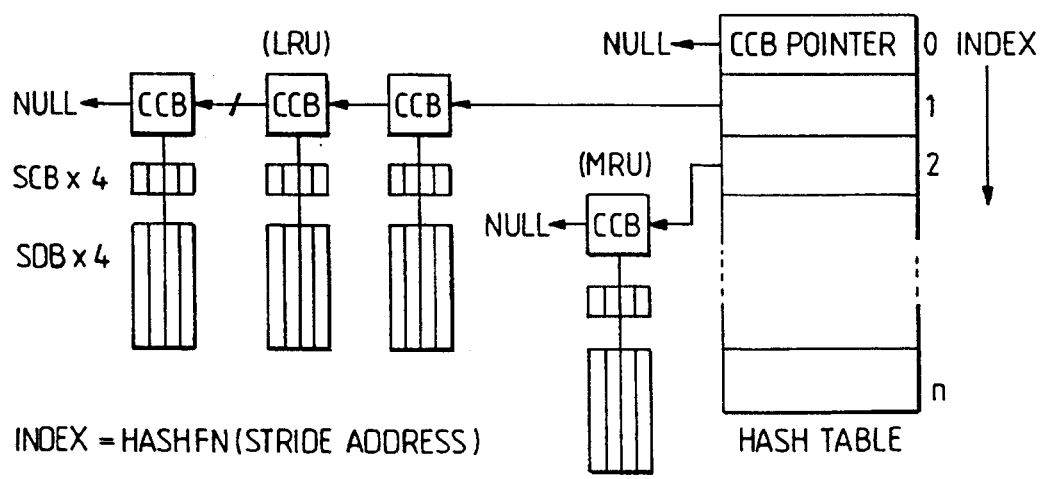
FIG. 4 illustrates the hash table and side-chaining employed in the cache system according to the invention.
Figure 5:
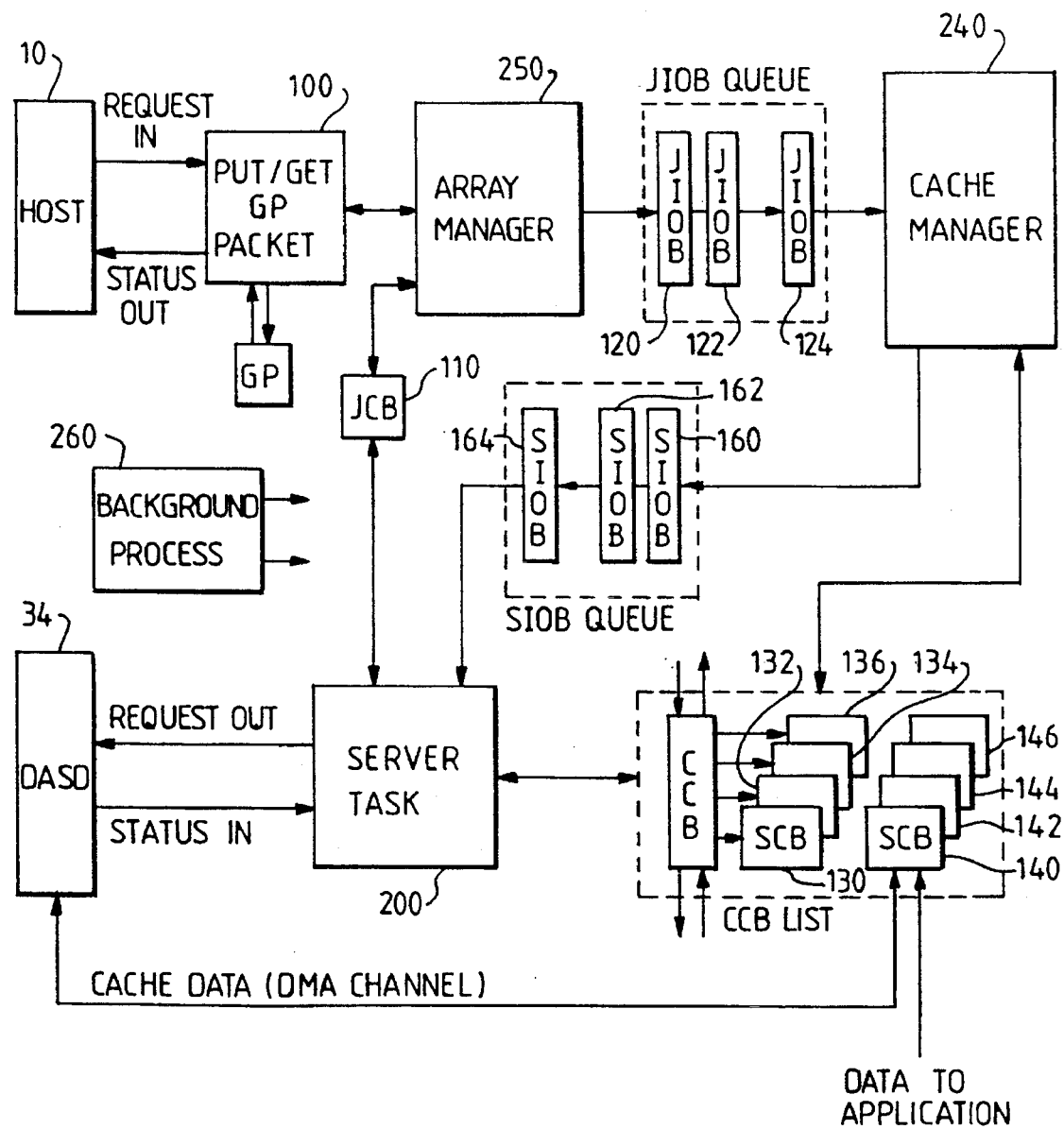
FIG. 5 shows the structure of the tasks employed in the implementation of the present invention, including their relationship to the control blocks.

The mechanism by which data requests by the host are serviced by the cache system will now be described with reference to FIGS. 3 to 5. FIG. 3 shows the association of the storage areas (control blocks) used by the host computer program, embodying a preferred implementation of the present invention, to hold control information. FIG. 5 shows the structure of the program (subdivided into Requester and Server tasks) including their relationship to the defined control blocks.

Incoming requests from the host 10 are placed in a queue (GPin) 100 of IO packets. The Host now waits for a Status to be returned back to it, signalling success/failure of the request. The queue is now read by the subsystem, and the resulting 'Get/Put' packet (GPBLK) is 'striped' into a number of jobs (JIOBs) 120, 122, 124, the completion of all these subtasks satisfying the original request. Each of these JIOBs has the property that the entire data transfer request resides in a single stripe ie. does not cross a stripe boundary. To enable progress tracking of these JIOBs, each JIOB is associated with a single parent Job Control Block (JCB) 110 which has a one-to-one correspondence with the original application request. Each of these JIOBs are now queued, ready for execution. These JIOBs are now processed by the Cache Manager (FIG. 4). If the data is available in Cache Memory, that particular JIOB may be able to complete immediately. In the case that some, or indeed all, the data is not present in the Cache, the data must be fetched from the Disk 34 (only for the case of a Read request as Writes don't require disk accesses). Cache management is composed of a doubly-linked list of Cache Control Blocks (CCBs) 150, maintained in a Most-Recently-Used (MRU) ordering scheme. To allow efficient cache searching, hashing is performed on the unique stride address. To allow for hash 'collisions', sidechaining is also used.

To enable completion of a JIOB, further subdivision is undertaken and a menu of Stripe IO requests (SIOBs) 160, 162, 164 is created. Each stripe that forms part of a stride has an associated control block called a Stripe Control Block (SCB) 130, 132, 134, 136. This maintains status of the associated memory area (Stripe Data Block—SDB), and allows queuing of JIOBs that operate upon common stripes. Each SIOB created is placed on the disk IO queue for subsequent execution.

As and when SIOBs complete, the SCB from which they were issued is updated and status is gathered. When ALL SIOBs have completed, any JIOBs that were queued because they could not immediately complete can now complete. As and when these JIOBs complete, the JCB from which they were issued is updated and status gathered. When ALL JIOBs have completed the entire request can now complete. Status is returned to the Host in the GP packet originally received into the subsystem.

The format of each of the control blocks used in this embodiment of the invention will now be described.

1. Get/Put Packet Block—GPBLK

The following illustrates the preferred embodiment of the packet block used to receive requests from the Host Application:

| GPBLK_rwflag |
| --- |
| GPBLK_length |
| GPBLK_diskaddr |
| GPBLK_paramID |
| GPBLK_bufferptr |
| GPBLK_returncode |

GPBLK_RWFLAG—specifies whether Host request is Read or Write.

GPBLK LENGTH—the length of the entire access in sectors,

GPBLK_DISKADDR—virtual sector number (in array) of the start of the request,

GPBLK_PARAMID—tag ID for returning completion status.

GPBLK BUFFERPTR—physical address in Host of start of data area,

GPBLK_RETURNCODE—contains the merged statuses of each of the separate requests for return to the Host, The merged statuses from each of the separate accesses are also returned in this packet,

2. Job Control Block—JCB

The Job Control Block is a 'parent' to each of the spawned JIOBs and has a one-to-one relationship with User requests (incoming GPBLKs). The completion of a JIOB causes the JCB_counter to decrement, and status is merged with the current status.

The following illustrates the preferred embodiment of the Job Control Block:

| JCB_counter |
| --- |
| JCB_waitAllsem |
| JCB_waitAllhandle |
| JCB_returncode |

JCB_COUNTER—maintains the number of uncompleted JIOBs that need to complete before status can be returned to the Host.

JCB_WAITALLSEM and JCB_WAITALLHANDLE—Semaphore and Handle used to suspend the Host request until completion of all the outstanding sub-requests (JIOBs).

JCB_RETURNCODE—Merged statuses of all the sub-requests.

3. Job I/O Control Block—JIOB

The JIOB contains a portion of the Host request, but is contained within a single stripe.

The following is an illustration of the preferred embodiment of the JIOB:

| JIOB_Qptrs |
| --- |
| JIOB_rwflag |
| JIOB_device |
| JIOB_diskaddr |
| JIOB_length |
| JIOB_bufferptr |
| JIOB_JCBptr |
| JIOB_SCBptr |

JIOB_QPTRS—Allows queuing of the JIOB in various queues.

JIOB_RWFLAG—Indicates whether this IO request to the DASD is read or write.

JIOB_DEVICE—This is the required physical device to which the request is destined.

JIOB DISKADDR—This is the physical sector address on the device of the start of transfer.

JIOB_LENGTH—This is the length of transfer in sectors. Note that this length is such as to never cause a stripe boundary to be traversed.

JIOB BUFFERPTR—This is calculated new address in the Host of the start of data for this subtask.

JIOB_JCBPTR—A pointer back to the parent JCB from which this subtask was issued.

JIOB_SCBPTR—A pointer to the SCB to which this JIOB refers.

4. Cache Control Block—CCB

The Cache Control Block is maintained in a doubly-linked list and binds together a number (number of devices) of Stripe Control Blocks (SCBs), which allows caching on a stride basis.

The following is an illustration of the preferred embodiment of the Cache Control Block:

| CCB_Qptrs |
| --- |
| CCB_InUseflag |
| CCB_hashptr |
| CCB_strideaddr |
| CCB_SCBptr[0] |
| CCB_SCBptr[1] |
| CCB_SCBptr[2] |
| CCB_SCBptr[ndev] |

CCB_QPTRS—Linkage pointers to maintain the CCB list and the FreeCCB queue.

CCB INUSEFLAG—Protection to avoid freeing-off CCBs that are currently in use.

CCB_HASHPTR—Allows collisions in the Hash Table. This points to the next CCB which would have resided at this hash location, if it were available.

CCB STRIDEADDR—Holds the unique Stride Address. Needed because of the possibility of hash 'collisions'.

CCB_SCBPTR( DEVICE )—An array of pointers, initially null, referencing associated Stripe Control Blocks (SCBs). One per device.

5. Stripe Control Block—SCB

The Stripe Control Block maintains the status of the Cache Memory also known as the Stripe Data Block (SDB). There is a one-to-one relationship between SCB and SDB, but an SDB doesn't necessarily exist if the corresponding SCB exists. The allocation of SDB/SCB memory is based on a dynamic scheme.

The following is an illustration of the preferred embodiment of the Stripe Control Block:

| SCB_Qptrs |
| SCB_validmask |
| SCB_modifiedmask |
| SCB_IOstate |
| SCB_counter |
| SCB_SIOBQptrs |
| SCB_RwaitQptrs |
| SCB_WwaitQptrs |
| SCB_dataptr |
| SCB_returncode |

SCB_QPTRS—Used to maintain list of 'free SCBs'.

SCB_VALIDMASK—Identifies each sector held in Stripe DataBlock (SDB) as being valid or garbage. One bit per sector.

SCB_MODIFIEDMASK—Identifies sectors in the SDB which need to be saved to disk at some point (which DASD sectors have become invalid).

SCB_IOSTATE—Indicates one of four SCB states—Idle, Wait Reading, Wait Writing or Wait Committing.

SCB_COUNTER—Retains a count of uncompleted DASD requests (SIOBs) which need to be performed before the SCB can return to the Idle state.

SCB_SIOBQPTRS—This is the head of a temporary linked list (menu) of SIOBs.

SCB_RWAITQPTRS—This is the head of a linked list of suspended JIOBs, which all requested a Read operation on the associated SDB. Only when the SCB_counter returns to zero can these requests be satisfied.

SCB_WWAITQPTRS—Similar to the Read wait queue above, but these JIOBs all requested a Write operation. These can only be executed after ALL read operations have completed.

SCB_DATAPTR—This points to the Stripe Data Block(SDB). If an SDB has not yet been allocated to this SCB, the pointer will be Null.

SCB_RETURNCODE—Maintains a merged status from the SIOBs that were issued to satisfy this sub request.

6. Stripe I/O Block—SIOB

The Stripe I/O Block is a queued request sent to the DASD, the purpose of which is to fetch uncached or store cached sectors to/from the DASD itself. Since the original JIOB is contained within a stripe, the number of SIOBs spawned from a JIOB will be at most N/2, where N is the number of sectors per stripe.

The following is an illustration of the preferred embodiment of the Stripe I/O Block:

| SIOB_Qptrs |
| SIOB_rwflag |
| SIOB_device |
| SIOB_diskaddr |
| SIOB_length |
| SIOB_bufferoffset |
| SIOB_SCBptr |

SIOB_QPTRS—Maintains the SIOB in one of a number of various queues.

SIOB_RWFLAG—Indicates that this request is either Read or Write.

SIOB_DEVICE—References the physical DASD device number.

SIOB_DISKADDR—The physical LBA on the above DASD where the request is to commence.

SIOB_LENGTH—The length in sectors of the required access. This is such that a stripe boundary will not be crossed, nor will valid & modified data in the cache be over written on a DASD Read request.

SIOB_BUFFEROFFSET—This is the offset in sectors from the start of the SDB (SCB_dataptr) at which data transfer is to commence. (NB. SCB_dataptr may be Null at this time if an SDB has not yet been allocated)

SIOB_SCBPTR—Points back to the parent SCB from which this SIOB was generated.

The management of the cache is based on a 'most recently used' algorithm. An incoming data request (read or write) is initially checked to see if cache memory has been previously allocated by an earlier request. If no memory has been allocated, an attempt is made to allocate a memory area for data storage. If this fails, the command is suspended until memory becomes available.

When the requested memory area is already present, or the above allocation is successful, the host request now operates upon this cache memory. When a read requests data not currently valid in the cache, a disk IO is performed from disk into cache memory before the requested data is copied to the host application. A write request merely copies data from the application to cache memory (acts as a Fast Write Buffer).

The Cache Control Block (CCB) allows the individual stripes in a stride group to be manipulated together. These CCBs are retained in a doubly-linked list, in order of Most Recently Used (MRU) to Least Recently Used (LRU). A data access to a CCB causes that CCB to be moved to the MRU position in the CCB list. Thus unused CCBs and their corresponding Stripe Control Blocks (SCBs) and Stripe Data Blocks (SDBs) will be pushed to the LRU end of the CCB list. These CCBs will now become candidates for committing to DASD, enabling resources to be freed-up. The number of SCB's associated with a CCB will correspond to the number of disk storage devices in the array.

Rapid searching of the CCB list is performed by 'hashing'. As shown diagrammatically in FIG. 4, the stride address of the current request is 'hashed', and the resulting function return-value is used as in index into a Hash Table. The table 170 is an array of pointers 172 to CCBs held in the CCB list. If the entry is 'null', the CCB is not present in the list. If the Table points to a CCB, the stride addresses must be compared. This is because many stride addresses can map onto a single Hash Table entry. These 'collisions' are handled by 'side-chaining'. The first CCB referenced by the Hash Table has a pointer which is the head of a potential list of CCBs with different stride addresses, but common hash values. To verify existence/nonexistence of a CCB, this side-chain must be traversed, comparing stride addresses. Generally, the length of the side chain will be small, provided the Hash Table is large and the Hash Function chosen to minimise collisions.

The computer program embodying the present invention is divided into two main tasks which are separately responsible for servicing requests from the host and for servicing disk IO requests. These two tasks are called the Requester Task and the Server Task. FIG. 5 shows (in block diagrammatical form) the structure of the cache system according to the present invention including the operational relationship between the tasks and the control blocks.

The Requester Task is responsible for servicing the User Application requests, and attempts to progress these requests as far as possible. If a resource such as disk IO or cache memory is required and is not currently available, the partially completed request is placed on one of the many queues for later processing. In FIG. 5, the Requester Task is shown subdivided into two primary functions—the Array Manager 220 and the Cache Manager 240. A listing of the sequence of instructions in the Requester Task is shown in Table 1, appended hereto.

The Server Task (250 in FIG. 5) services the waiting disk IO requests. On completion of the requested disk IO, the Requester Task is indirectly signaled of its completion by the Server updating the status of the associated control block. A listing of the sequence of instructions in the Server Task is detailed in Table 2, appended hereto.

A Background process (260 in FIG. 5) is also provided which has two primary functions—(i) committing CCBs at the bottom of the MRU list to the disk array, thereby freeing up cache resource and (ii) when cache resource is available, removing SCBs from the SCBWaitqueue and allocating SDBs thereto. As part of the process of committing a CCB to disk, the background process will perform parity generation including reading data from disk as necessary. A listing of the instructions in the Background Process is detailed in Table 3, also appended hereto.

As shown in FIG. 5, a GP packet 100 is subdivided by the Array Manager 220 into a number of JIOBs 120, 122, 124 which are held on a JIOB queue. The Cache Manager processes the JIOBs and where necessary generates a number of SIOBs 160, 162, 164 which are placed on the disk IO queue where they are subsequently processed by the Server Task 250. As the SIOBs are completed the server task updates the SCBs 130, 132, 134 & 136.

There now follows a description of an example read/write scenario using the cache system of the present invention. In order to fully understand the example scenario, reference should be made as appropriate to TABLES 1 to 3 appended hereto.

1. If the host request is READ & ALL sectors are present in the cache, complete request NOW since no further disk IO is required.

2. If the host request is READ & SCB is Idle or WaitWriting & not ALL sectors valid, set IOstate to WaitReading, queue JIOB>SCBReadWaitQ, build menu of SIOBs needed to read ALL in valid sectors into stripe (see 3. below), and IF allocation of SDB successful commence disk IO (move SIOBs to diskIOQ) ELSE put SCB>SCBWaitQ (ie. postpone access until SDB is available).

3. If the host request is READ & SCB is WaitReading & not ALL sectors valid,assume the PREVIOUS access that set IOstate to WaitReading will fulfil THIS request also, so queue JIOB>SCBReadWaitQ.

4. If the host request is READ & SCB is WaitCommitting & not ALL sectors present, can't service request yet since the one-and-only SIOB menu queue is being used for the commits, so queue JIOB>SCBReadWaitQ.

5. If the host request is WRITE & SCB is Idle & SDB available, then complete whole of request now.

6. If the host request is WRITE & SCB is waiting (read/write/commit), queue JIOB>SCBWriteWaitQ. (NB. it is not permitted to Write before ALL Reads have completed, since non-Host initiated Cache reads cannot be allowed to overwrite valid Cache data.)

7. If the host request is WRITE & SCB is idle & no SDB available, queue JIOB>SCBWriteWaitQ, queue SCB>SCBWaitQ and set state to WaitWriting (postpone entire access until SDB is available).

After the final SIOB issued from an SCB has completed (SCBcounter=0), the following occurs:

8. If SCB is WaitReading, can now complete ALL JIOBs on SCBReadWaitQ. (ALL sectors requested will now be valid) (resume 3. above )

9. If SCB is WaitCommitting restart ALL JIOBs queued on SCBReadWaitQ from the beginning. (need to build SIOBmenu)(resume 4. above)

10. If SCB is WaitReading, can now complete ALL JIOBs on SCBWriteWaitQ. (allow Writes only after ALL Reads have finished) (resume 6. above)

11. If SCB is WaitCommitting/Writing restart ALL JIOBs on SCBWriteWaitQ from the beginning.(resume 6. above)

The Background Process attempts to restart SCBs queued on the SCBWaitQ. If an SCB exists on this queue, AND an SDB has become available—

12. If SCB is WaitReading (Reads ONLY or Read/Writes) recommence disk IO (move SIOBs to diskIOQ). (resume 2. or 7. above)

13. If SCB is WaitWriting (Writes ONLY), can now complete ALL JIOBs on SCBWriteWaitQ. (complete 7. above)

Although the present invention has been described in terms of a host software implementation, it will be appreciated'that in some circumstances, this may not be the optimum solution as it will result in more Host bus traffic. However, the software design described herein is based upon an 'event driven' environment which closely resembles hardware and software interrupt mechanisms. Such a design maps very closely to a dedicated second processor which could be a preferable implementation of the present invention.

TABLE1

REQUESTER TASK

Wait until IO to do
get IO packet (GP) from device driver
create parent JCB

TABLE1-continued

REQUESTER TASK stripe GP into n JIOBS (Array Manager)
queue each JIOB onto JIOBqueue
call execute JIOB queue
call background process
wait until JCB completed (ALL JIOBs associated with that JCB
completed) return IO packet to device driver loop
EXECUTE JIOB QUEUE: (Cache Manager)

while JIOBqueue not empty,
    ensure at least 1 CCB and 1 SCB available
    if unable to do so,
        return.
    unqueue JIOB from JIOBqueue
    perform a Hash Search on the stride address
    if a cache miss (CCB not present),
        initialise new CCB entry & link into Hash Table
    if no SCB present for requested stripe(device),
        initialise new SCB entry & link into associated CCB
        entry
    if READ,
        if ALL sectors required are present/valid in SDB,
call doneJIOB
        return.
    else
        queue JIOB onto SCB's ReadWaitqueue
    if SCB's IOstate is WaitReading or WaitCommitting
        return.
    if SCB's IOstate is WaitWriting or Idle,
        set IOstate to WaitReading
        create SIOBs required to read from disk all
        invalid sectors
    attempt to allocate an SDB if none present
    if failed,
        put SCB on SCBwaitqueue
        return.
    if have a valid SDB,
        move all SIOBs onto diskIOqueue
        return.
if WRITE,
    attempt to allocate SDB if none present
    if SCB's IOstate is waiting (read/write/commit),
        put JIOB on SCB's WriteWaitqueue
        return.
    if IOstate is idle and NO SDB present,
        put JIOB on WriteWaitqueue
        put SCB on SCBWaitqueue
        set IOstate to WaitWriting
        return.
    if IOstate is idle and SDB present,
        call doneJIOB
        return.

TABLE 2

SERVER TASK wait until diskIOqueue not empty
remove SIOB from queue
set DASD to new LBA (the disk address)
if READ,
    perform DASD Read (and wait for completion)
if WRITE,
    perform DASD Write (and wait for completion)
call doneSIOB
loop
DONE SIOB:

set valid bits for blocks read in from disk (cache miss) clear
modified bits for blocks written to disk (committed) decrement
parent SCB counter (number of unfinished SIOBs) if count goes
to zero,
    for all JIOBs in ReadWaitqueue,
        if IOstate is wait reading,
            call doneJIOB
        else
            put JIOB back on JIOBqueue
    for all JIOBs in WriteWaitqueue,
        if IOstate is wait reading,
            call doneJIOB
        else
            put JIOB back on JIOBqueue
    set IOstate to idle
    call execJIOBqueue
    call BackGround process
DONE JIOB:

if READ,
    copy SDB data to application buffer
if WRITE,
    update modified and valid masks
    copy application buffer to SDB
decrement parent JCB counter (number of unfinished JIOB) if
count goes to zero,
    signal JCB has completed (clear Requester task's wait
semaphore)

TABLE 3

BACKGROUND PROCESS if anything on SCBWaitqueue,
    try and get an SDB
    if successful,
        remove SCB from SCBWaitqueue
        if wait reading, (ie. reads and possibly writes
        occurred)
            move SIOBs onto diskIOqueue
        if wait writing, (ie. NO reads occurred to stripe)
            call doneJIOB with all JIOBs in write wait
            queue
            set IOstate to idle
call execute JIOBqueue, since some resources may have been freed
Progress CCB to a point where parity can be generated and
committed later,
try and commit a CCB to disk, by:
    scanning a certain percentage of the CCB chain (LRU to MRU),
for :-
        a CCB that does not possess SCBs that are waiting for TABLE 3-continued

BACKGROUND PROCESS any reason, and the CCB has all four SCBs with at least one SCB having modified data blocks.
    with this CCB, generate parity
        with each SCB with modified data block (inc parity stripe)
        attached to the CCB,
        set IOstate to wait comitting
        create SIOBs needed to write ALL modified blocks to disk
        queue these SIOBs onto the diskIOqueue

We claim:

1. A cache system in communication with a host application and a disk array, the disk array comprising a plurality of disk storage devices across which data is stored in strides, each stride comprising a multi-sector stripe of data on each of two or more devices of the disk array and an associated multi-sector parity stripe on a further device of the disk array, the cache system comprising:

a cache memory 50 for staging data to be transferred between a host application and a disk array 30;

a plurality of cache control blocks, each cache control block being associated with an individual data stride, at least a portion of which is stored in the cache memory, and each cache control block identifying where in the cache data stripes making up the data stride are located, a cache manager for maintaining an ordered list of cache control blocks, the cache control blocks in the list being ordered according to the time of last access; and wherein in response to a write or read request from the host application for data forming part of a data stride in the cache memory, the cache control block associated with the requested data stride is moved to the most recently accessed end of the cache control block list.

2. A cache system as claimed in claim 1, further comprising:

means for scanning the cache control block list to identify a data stride for which a complete set of data stripes is stored in cache memory;

means for generating parity, for each data stride so-identified, from the set of data stripes; and means for committing the data stripes and generated parity stripe to the disk array.

3. A cache system as claimed in claim 1, wherein each data stripe making up a data stride has associated therewith a stripe control block for maintaining the status of the area in cache memory in which the data stripe is stored; and wherein a cache control block for a data stride includes an array of pointers which reference the stripe control blocks associated with each of the data stripes making up the data stride.

4. A data processing system comprising:

a host computer system including host memory;

a plurality of disk storage devices configured as a disk array; and a cache system as claimed in claim 1, connected for communication to the disk array, for staging data to be transferred between the disk storage devices and host memory.

5. In a cache system including a cache memory 50 for staging data to be transferred between a host application and a disk array 30, the disk array comprising a plurality of disk storage devices 34,36,38,40 across which data is stored in strides, each stride comprising a multi-sector stripe of data on each of two or more devices of the disk array and an associated multi-sector parity stripe on a further device of the disk array, a method for managing data in the cache memory comprising the steps of:

maintaining an ordered list of cache control blocks, each cache control block of the list being associated with an individual data stride, at least a portion of which is stored in the cache memory, and each cache control block identifying where in the cache data stripes making up the data stride are located, the cache control blocks in the list being ordered according to the time of last access; and responsive to a write or read request from the host application for data forming part of a data stride in the cache memory, causing the cache control block associated with the data stride to be moved to the most recently accessed end of the cache control block list.

6. The method of claim 5 further comprising the step of:

scanning the cache control block list to identify a data stride for which a complete set of data stripes is stored in cache memory;

for each identified data stride, generating parity from the set of data stripes; and committing the data stripes and generated parity stripe to the disk array.

7. The method of claim 5, wherein each data stripe making up a data stride has associated therewith a stripe control block for maintaining the status of the area in cache memory in which the data stripe is stored; and wherein a cache control block for a data stride includes an array of pointers which reference the stripe control blocks associated with each of the data stripes making up the data stride.

8. An article of manufacture for use in a computer system including a cache memory 50 for staging data to be transferred between a host application and a disk array 30, the disk array comprising a plurality of disk storage devices 34,36,38,40, said article of manufacture comprising a computer-readable storage medium having a computer program code embodied in said medium which cause the computer to:

store data in the plurality of disk storage devices 34, 36, 38, 40 across which data is stored in strides, each stride comprising multi-sector stripes of data on each of two or more devices of the disk array and an associated multi-sector parity stripe on a further device of the disk array;

maintain an ordered list of cache control blocks, each cache control block of the list being associated with an individual data stride, at least a portion of which is stored in the cache memory, and each cache control block identifying where in the cache data stripes making up the data stride are located, the cache control blocks in the list being ordered according to the time of last access; and responsive to a write or read request from the host application for data forming part of a data stride in the cache memory, cause the cache control block associated with the data stride to be moved to the most recently accessed end of the cache control block list.

9. The article of manufacture of claim 8 wherein the computer program code may further cause the computer to:

scan the cache control block list to identify a data stride for which a complete set of data stripes is stored in cache memory;

for each identified data stride, generate parity from the set of data stripes; and commit the data stripes and generated parity stripe to the disk array.

10. The article of manufacture of claim 8, wherein each data stripe making up a data stride has associated therewith a stripe control block for maintaining the status of the area in cache memory in which the data stripe is stored; and wherein a cache control block for a data stride includes an array of pointers which reference the stripe control blocks associated with each of the data stripes making up the data stride.

* * * * *